United States Patent
Prescott et al.

(10) Patent No.: US 10,052,568 B2
(45) Date of Patent: Aug. 21, 2018

(54) CONFIGURATIONS AND METHODS FOR GAS-LIQUID SEPARATORS

(71) Applicant: FLUOR TECHNOLOGIES CORPORATION, Aliso Viejo, CA (US)

(72) Inventors: Clifford Neal Prescott, Houston, TX (US); Jianfeng (Jeff) Zhang, Sugar Land, TX (US)

(73) Assignee: Fluor Technologies Corporation, Sugar Land, TX (US)

(*) Notice: Subject to any disclaimer, the term of this patent is extended or adjusted under 35 U.S.C. 154(b) by 904 days.

(21) Appl. No.: 14/226,603

(22) Filed: Mar. 26, 2014

(65) Prior Publication Data

US 2014/0290485 A1    Oct. 2, 2014

Related U.S. Application Data

(60) Provisional application No. 61/806,288, filed on Mar. 28, 2013.

(51) Int. Cl.
*B01D 19/00* (2006.01)

(52) U.S. Cl.
CPC .................. *B01D 19/0042* (2013.01)

(58) Field of Classification Search
None
See application file for complete search history.

(56) References Cited

U.S. PATENT DOCUMENTS

| 4,661,127 A | 4/1987 | Huntley |
| 4,948,393 A * | 8/1990 | Hodson ............... B01D 17/00 208/186 |
| 6,468,335 B1 | 10/2002 | Polderman |
| 6,554,066 B2 | 4/2003 | Lopes et al. |
| 7,540,902 B2 | 6/2009 | Esparza et al. |
| 7,611,635 B2 | 11/2009 | Chieng et al. |
| 8,282,711 B2 | 10/2012 | Grenstad et al. |
| 2010/0180769 A1 * | 7/2010 | Grenstad ............... E21B 43/36 95/260 |

(Continued)

FOREIGN PATENT DOCUMENTS

| EP | 0711903 | 9/1999 |
| WO | 2001/087453 | 11/2001 |

(Continued)

OTHER PUBLICATIONS

Moritis, Guntis, "Subsea Gas-Liquid Separation Helps Boost Production Rates", Oil & Gas Journal, Oct. 26, 2009.

(Continued)

*Primary Examiner* — Amber R Orlando
*Assistant Examiner* — Phillip Y Shao
(74) *Attorney, Agent, or Firm* — Conley Rose, P.C.

(57) ABSTRACT

Contemplated gas-liquid separators and especially subsea gas-liquid separators have a main pipe with a plurality of descending branch pipes that are fluidly coupled to the main pipe and each other such as to allow disengagement of the gas into the main pipe while liquid and sand descend into the lower ends of the branch pipes. Sand accumulation in the lower ends of the branch pipes is preferably prevented by lateral serial flow of liquid and sand from one branch pipe to the next and use of a flush liquid that is drawn from one or more branch pipes.

15 Claims, 4 Drawing Sheets

(56) References Cited

U.S. PATENT DOCUMENTS

2012/0098674 A1* 4/2012 McStay .................. G01V 3/15
                                                    340/850

FOREIGN PATENT DOCUMENTS

| WO | 2010/070289 | 6/2010 |
| WO | 2010/151392 | 12/2010 |
| WO | 2011/028093 | 3/2011 |
| WO | 2013/130856 | 9/2013 |
| WO | 2013/135600 | 9/2013 |

OTHER PUBLICATIONS

Offshore, Technical Digest, Advances in Subsea Recovery; sponsored by FMC Technologies at www.maximizerecovery.com; 2012.

* cited by examiner

US 10,052,568 B2

CONFIGURATIONS AND METHODS FOR GAS-LIQUID SEPARATORS

This application claims priority to U.S. provisional application with the Ser. No. 61/806,288, which was filed 28 Mar. 2013.

FIELD OF THE INVENTION

The field of the invention is devices and methods for gas-liquid separation, especially as it relates to subsea separators.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

Gas-liquid separation has become increasingly important in many subsea hydrocarbon production environments to enable and/or improve operations and project economy. In some cases separators operate in a vertical orientation (e.g., Caisson separators or vertical multiple pipe separators), while in other cases separators operate in horizontal orientation (e.g., drum type separators as described in WO 2010/151392, horizontal pipe separators as described in WO 2013/130856). Still further examples for known separators are described in U.S. Pat. No. 4,948,393, U.S. Pat. No. 6,554,066, WO 01/87453, WO 2011/028093, and EP711903B1. All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Unfortunately, where the produced fluids carry sand or other particulate solids (also referred to as "sand" herein), sand accumulation is a major concern in horizontal separators. Sand accumulation in horizontal separators is typically prevented by sand removal upstream of the separator (e.g., de-sanding hydrocyclone, vessel based sand remover, etc.), and/or periodical jetting inside the separator to remove sand. However, and especially where the gas-liquid separators are installed in a subsea environment, upstream sand removal and/or jetting introduce further complexities and potential points of failure, which is particularly problematic in deepwater applications where smaller separators and fewer components in the overall system are desirable. Moreover, and especially where horizontal separators are used, less than desirable degrees of gas-liquid separation can be encountered.

Therefore, even though various separator configurations and methods are known in the art, all or almost all of them suffer from one or more disadvantages. Thus, there is still a need to provide improved gas-liquid separators, especially where the separator is operated in a subsea environment.

SUMMARY OF THE INVENTION

The inventive subject matter is drawn to horizontal separator devices and methods (especially subsea separators) that reduce and in most cases entirely prevent deposition of sand within critical locations of a horizontal liquid-gas separator while allowing sand to settle at or near a location where the so isolated sand can be removed from the separator, typically together with the separated liquid. Most preferably, the sand removal can be achieved with a flushing system that is appreciably simpler than most known jetting systems. Thus, and viewed from a different perspective, contemplated devices and methods will eliminate the need for upstream sand removal devices and so reduce the number of components in a subsea system.

In one aspect of the inventive subject matter, the inventors contemplate a gas-liquid separator that includes a main pipe that receives a fluid comprising a gas, a liquid, and sand, wherein the main pipe is fluidly coupled to a plurality of descending branch pipes. Most typically, the branch pipes are fluidly coupled to each other such as to allow the liquid to segregate from the main pipe into a first branch pipe and to migrate from the first into at least a second branch pipes while the gas remains in the main pipe. Moreover, it is generally preferred that at least some of the branch pipes are fluidly coupled to a flush conduit and a liquid withdrawal conduit. As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In especially contemplated aspects, the descending branch pipes are coupled to the main pipe at a non-rectangular angle (and most typically form a V-shape), and/or are coupled to each other at a lower end. While not limiting to the inventive subject matter, contemplated gas-liquid separators also include a cross-flow conduit fluidly that is coupled to the second and a third descending branch pipe such that at least a portion of the fluid flows from the second to the third descending branch pipe. Especially suitable cross-flow conduits are configured to reduce or eliminate deposition of sand in the cross-flow conduit (e.g., via smaller diameter to increase flow, and/or installation at an angle from horizontal).

It is further contemplated that the gas-liquid separator also includes a feed manifold and/or a gas manifold that is fluidly coupled to respective ends of the main pipe to so allow for multiple parallel separation trains. Additionally, it is contemplated that the separator will include a flush conduit that is fluidly coupled to at least one of the descending branch pipes such that the flush conduit receives the liquid as a flushing fluid from the at least one of the descending branch pipes, and/or that the liquid withdrawal conduit is configured to allow removal of the liquid and the sand. In yet further contemplated aspects, the gas-liquid separator also comprises a plurality of sensors, which are most typically pressure and/or flow sensors.

Viewed from a different perspective, the inventors also contemplate a gas-liquid separator for separation of a gas-, liquid-, and sand-containing fluid that comprises a main pipe with a first end and a second end, and a plurality of descending branch pipes coupled to the main pipe between the first and second ends. Most typically, a first, a second, a third, and a fourth of the branch pipes are fluidly coupled to the main pipe via their respective upper ends, while the first and second branch pipes and the third and fourth branch pipes are fluidly coupled to each other via their respective lower ends. In further contemplated aspects, a cross-flow conduit is fluidly coupled to the second and third branch pipes in a position intermediate the upper and lower ends of the second and third branch pipes such as to allow flow of the fluid from the second to the third branch pipe. Moreover, preferred separators also include a flush conduit and/or a liquid withdrawal conduit that are fluidly coupled to the lower end of at least one of the first and second, and third and fourth branch pipes.

As noted before, it is typically preferred that one end of the main pipe of the gas-liquid separator is fluidly coupled to a feed manifold and that the other end of the main pipe is fluidly coupled to a gas manifold. In further preferred aspects, the cross-flow conduit is configured to reduce or eliminate deposition of sand in the cross-flow conduit (e.g., via smaller diameter to increase flow, and/or installation at an angle from horizontal). While not limiting to the inventive subject matter, it is further contemplated that the flush conduit is fluidly coupled to at least one of the descending branch pipes such that the flush conduit receives the liquid as a flushing fluid from the at least one of the descending branch pipes. Most typically, the liquid withdrawal conduit is configured to allow removal of the liquid and the sand. In yet further contemplated aspects, the gas-liquid separator will also include a pressure sensor and/or a flow sensor (e.g., arranged and/or configured such as to allow determination of sand accumulation).

Consequently, the inventors also contemplate a method of separating a gas from a fluid that includes the gas, a liquid, and sand. Especially preferred methods include a step of providing a main pipe to which a plurality of communicating descending branch pipes are fluidly coupled at respective upper ends, wherein at least two of the branch pipes are further fluidly coupled to each other at respective lower ends. In another step, the fluid is fed into a feed end of the main pipe at a volume and velocity such that the liquid migrates though the communicating descending branch pipes while the gas migrates from the branch pipes to the main pipe via the respective upper ends; and in yet another step, the gas is withdrawn from a discharge end of the main pipe and withdrawing the liquid from the respective lower ends. It should be noted that all methods described herein can be performed in any suitable order unless otherwise indicated herein or otherwise clearly contradicted by context.

In especially preferred methods, the communicating descending branch pipes form a V-shaped conduit, and it is typically preferred that undesirably high sand accumulation is avoided or remedied by introduction of a flush liquid to the at least two of the branch pipes at the respective lower ends. Most typically, the flush liquid will comprise the liquid, and the flush liquid is withdrawn from at least one of the branch pipes. The liquid of the fluid is preferably withdrawn from the respective lower ends along with the sand.

Various objects, features, aspects and advantages of the inventive subject matter will become more apparent from the following detailed description of preferred embodiments, along with the accompanying drawing in which like numerals represent like components.

DETAILED DESCRIPTION

The inventors have discovered that a fluid that contains a gas, a liquid, and sand, can be separated into a gas portion and a liquid portion containing the sand without the sand clogging or otherwise inhibiting the separation process. Most preferably, the fluid is fed into one end of a main pipe from which a plurality of descending, and typically communicating branch pipes extend such that the liquid and sand fall preferentially into the descending branch pipes and such that the gas can ultimately be separated from the fluid at the other end of the main pipe. The descending branch pipes are preferably configured and coupled to the main pipe such that (a) gas can further separate out from the liquid in the branch pipe and escape upwards from the branch pipe back into the main pipe, and (b) liquid and sand settle to the bottom of the branch pipes.

In particularly preferred aspects, the liquid and sand are withdrawn from the lower ends of the branch pipes, and sand accumulation is prevented at the lower ends by use of a flush fluid that is introduced into the branch pipes. In some embodiments, at least some of the flush fluid is withdrawn with the liquid at the lower end of the branch pipes while another portion of the flush fluid and the liquid can move via a cross-flow conduit to another branch pipe. In particularly preferred aspects, at least two of the descending branch pipes are fluidly coupled to each other via their lower ends to form a V-shaped element, and multiple V-shaped elements can then be fluidly coupled to each other via cross-flow conduits. Moreover, and especially where the flush fluid is a portion of the liquid, it is preferred that the flush fluid is recycled.

Figure 1:
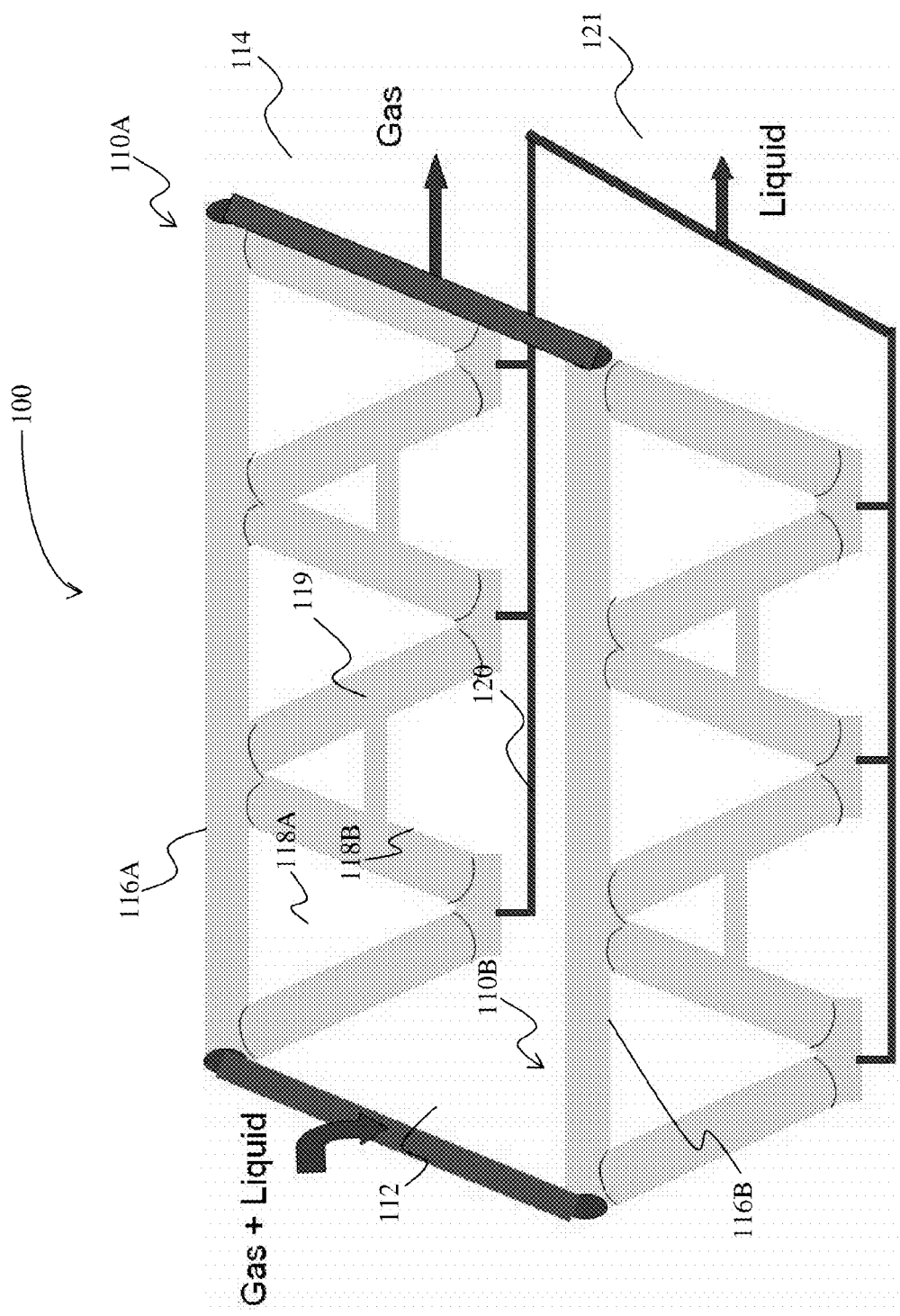
FIG. 1 schematically and exemplarily illustrates separation of gas from a liquid in a separation unit according to the inventive subject matter.

FIG. 1 shows an exemplary configuration of a contemplated gas-liquid separator 100. Here, the device is made of two separator units 110A and 110B that are fluidly coupled to each other in parallel via feed manifold 112 and gas manifold 114. However, it should be appreciated that depending on the flow rates, fluid properties, water depth, pressure, etc., more than two separation units may be used. Where multiple units are used, coupling is preferably in parallel, but serial coupling is also deemed suitable. Still further, it should be appreciated that the separation units may also be fluidly coupled to each other such that a descending branch pipe of one main pipe will be fluidly coupled to another descending branch pipe of another main pipe to so form a network of interconnected separation units (not shown). Thus, for sake of simplicity, only two separator units are shown in FIG. 1 in which each unit comprises a top main pipe 116A and 116B for gas flow and a series of descending branch pipes 118A, 118B that are coupled to each other on their respective lower ends to form a V-shaped element for liquid and sand flow. As should be readily apparent, the gas separated from the fluid will flow through the main pipe while the separated liquid and sand will flow out of the lower ends of the branch pipes. Serial flow from one V-shaped set of branch pipes to the next is achieved via cross-flow conduits 119. It should be appreciated that it is now possible not only to separate the liquid and sand from the gas by gravity in a down flow motion of the liquid and sand into the descending branch pipes, but also to further allow gas to escape from each of the descending branch pipes in an up-flow motion form the branch pipes to the main pipe. The so separated gas flow is then collected at the other end of the separator in the gas manifold 114, while liquid and sand will be collected and removed via a liquid withdrawal conduit 120 and liquid manifold 121.

As is already schematically illustrated in FIG. 1, the gas-liquid separator is typically operated in a horizontal orientation (with respect to the main pipe). As used herein, the term "horizontal" refers to exactly horizontal and near horizontal (i.e., less or equal than +/−30 degrees from normal, and more preferably less or equal than +/−20 degrees from normal, and most preferably less or equal than +/−10 degrees from normal). Thus, the primary separation principle is based on a density difference of the components in the fluid, within both the main pipe and the descending branch pipes. Notably, as the path for the liquid and sand is extended (and tortuous) relative to the path of the gas, additional gas can be separated from the liquid and sand due to the fluid coupling of the descending branch pipes. Moreover, and contrary to other devices, every other descending branch pipe also allows for up-flow of liquid and sand, thus further facilitating separation of gas from the liquid and sand.

Figure 2A:
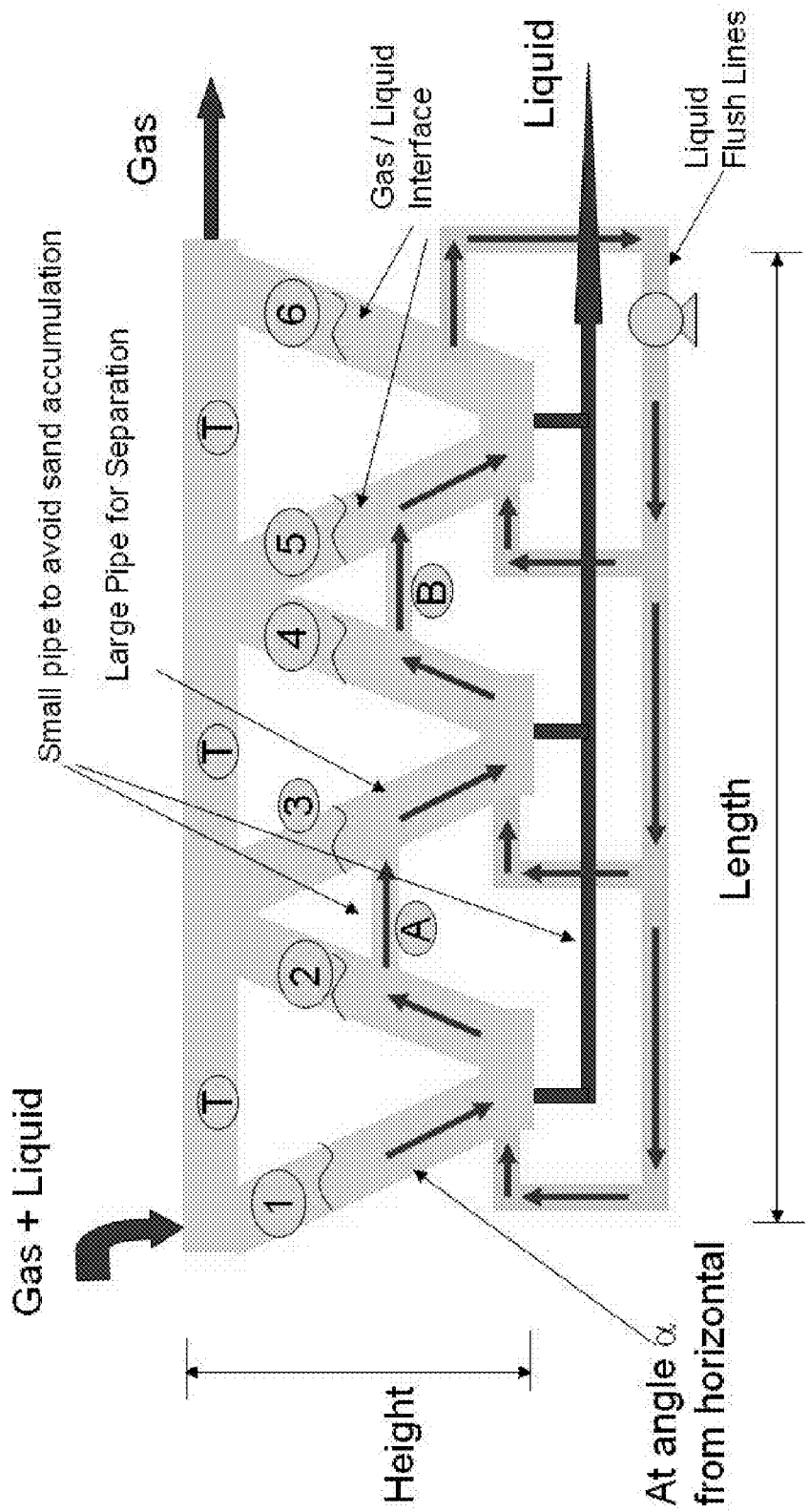
FIGS. 2A-2C are exemplary schematic detail views of a separation unit according to the inventive subject matter.

FIG. 2A shows in more detail a cross section of an exemplary separator illustrating how separation is achieved and sand accumulation is avoided. After the gas/liquid fluid mixture enters the unit through one end of the main pipe (typically via a feed manifold), gas with entrained liquid droplets mostly flow through the top main pipe ("T"), in which most or all of the liquid droplets will eventually drop out to the descending branch pipes below. The liquid with residual entrained gas will flow down the branch pipe 1 to the lower end of the branch pipe where branch pipe 1 is fluidly coupled to branch pipe 2. Most preferably, branch pipes 1 and 2 are maintained at such an angle from horizontal so that deposition of sand on the pipe walls is reduced, if not entirely avoided. Consequently, it should be noted that the angle of the descending branch pipes not only advantageously avoids settling of sand, but also increases the pathway taken by a liquid to further allow for disengagement of the gas from the liquid. Due to gravity, sand will tend to drop out of the flow at the ends of pipes 1 and 2. Of course, it should be appreciated that the lower ends of the descending branch lines can be fluidly coupled in a variety of manners. For example, the lower ends may be coupled to each other by welding, via a pipe fitting, via an intermediate bas that may have a shape to encourage settling of sand, etc.

Most typically, a liquid withdrawal conduit is implemented at or near the lower ends of the descending branch pipes (typically where the pipes are fluidly coupled to each other). The liquid withdrawal conduit may be configured with a fixed-width opening to so allow a predetermined flow of liquid out of the lower ends of the branch pipes. Alternatively, the liquid withdrawal conduit may also be fluidly coupled to a valve or other flow regulating element to so control flow of the liquid and sand out of the branch pipes. Thus, a portion of the liquid will flow out of the unit through a liquid outlet pipe that is fluidly coupled to the respective lower ends of the branch pipes, and most of the sand particles that drop out of the flow in pipes 1 and 2 will flow out of the separator together with the exiting liquid. Viewed from a different perspective, it should be noted that a pair of branch pipes will have separate fluid and sand withdrawal ports, which helps distribute sand burden across multiple drain points and so helps reduce clogging or otherwise undesirable build-up conditions.

In the example of FIG. 2A, about halfway up on pipe 2, a cross-flow conduit A is fluidly coupled to the branch pipe and sized to enable sufficient liquid velocity from branch pipe 2 to branch pipe 3 so that sand will not settle within the cross-flow conduit. In most cases, the inner diameter of the cross-flow conduit is smaller than the inner diameter of the descending branch pipe. Moreover, the cross-flow conduit may also be oriented at a suitable angle from horizontal to further prevent settling of sand in the cross-flow conduit. Thus, it should be appreciated that the cross-flow pipe A fluidly connects the V-shaped elements formed from pipes 1+2 and pipes 3+4, which further elongates the tortuous path for the liquid and the sand. Any residual gas that is separated out from the liquid will flow up pipe 2 to join the gas in main pipe T, while liquid and the remaining entrained gas flow through cross-flow pipe A to the second V-shaped element, where the flow pattern of the first V-shaped element is repeated. In the example of FIG. 2A, a total of 6 pipes are shown at angle to so form three V-shaped elements. As already noted before, it should be appreciated that the total number of pipes may vary considerably and a specific number will depend on the particular circumstances and parameters of use. However, it is generally contemplated that at least two V-shaped elements (fluidly coupled by a cross-flow conduit) are employed for the separators contemplated herein.

To mitigate excessive sand accumulation at the lower ends of the descending branch lines, a sand flushing circuit is implemented as exemplarily and schematically depicted in FIG. 2A. Here, pumping of the liquid for flushing can be either a dedicated small pump or a slip stream from the pump for liquid flowing out of the separator. Most typically, however, the liquid is recirculated from at least one descending branch pipe back to at least one flushing port of at least one V-shaped element. If sand accumulates in the separator, it is expected to be self limiting because all the liquid flows down one leg of the V and up the other. Consequently, the liquid velocity will gradually increase as the settled sand layer increases in depth. It should be further recognized that the sand flushing operation may be performed continuously, on a periodical basis as precaution, or on demand (e.g., on indication that the sand layer depth has reached a certain level, or if unforeseen circumstances cause the sand layer to increase to unacceptable depth). Consequently, the inventors also contemplate one or more control circuits to operate the flush conduits and/or associated control valves.

Figure 2B:
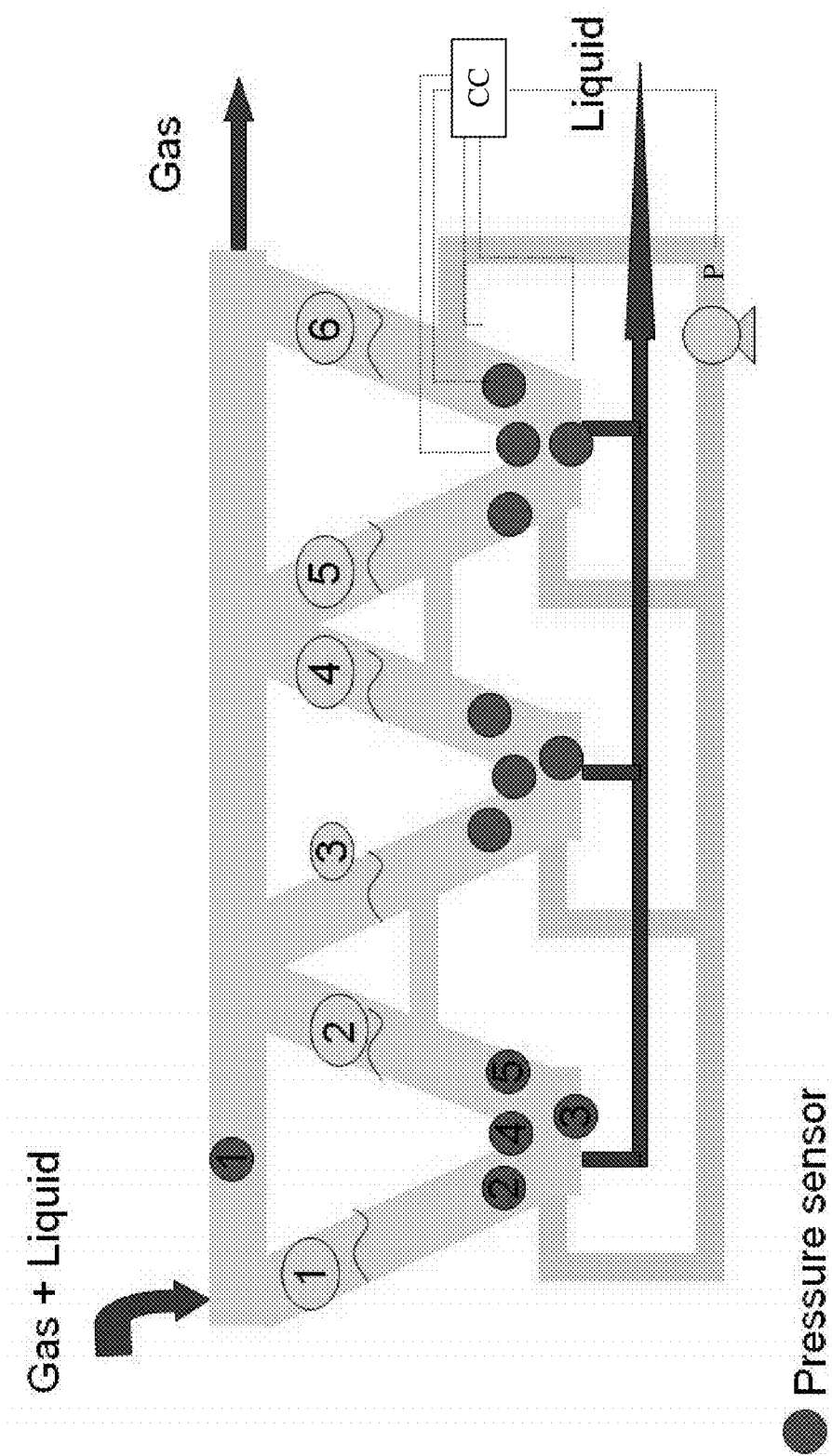

FIG. 2B illustrates one exemplary method that can be used to obtain an indication of sand layer depth. Here, a number of pressure sensors are installed on the separator, on the main pipe T, on the descending branch pipes 1 and 2 near the base, and on the top and bottom of the base. Using such arrangement, it should be appreciated that the depth of the sand layer can be estimated in several ways. For example, the measurements by sensors 1, 2, and 5 can be compared to determine whether sand accumulation has caused large pressure differential when flow will pass around the base. Alternatively or additionally, the measurements of 3 and 4 can be compared to estimate the sand layer thickness since sand accumulation will increase the difference of the two measurements due to the difference in density between sand and liquid. Control circuit CC may then activate pump P to unsettle the sand accumulation and optionally to (further) open valves and/or activate a liquid pump to remove the sand deposit. Of course, it should be appreciated that each V-shaped element may have its own pump and control circuit, or that multiple V-shaped elements may be operated from one control circuit using one or more pumps and/or associated valves to so address individual sand deposits.

Figure 2C:
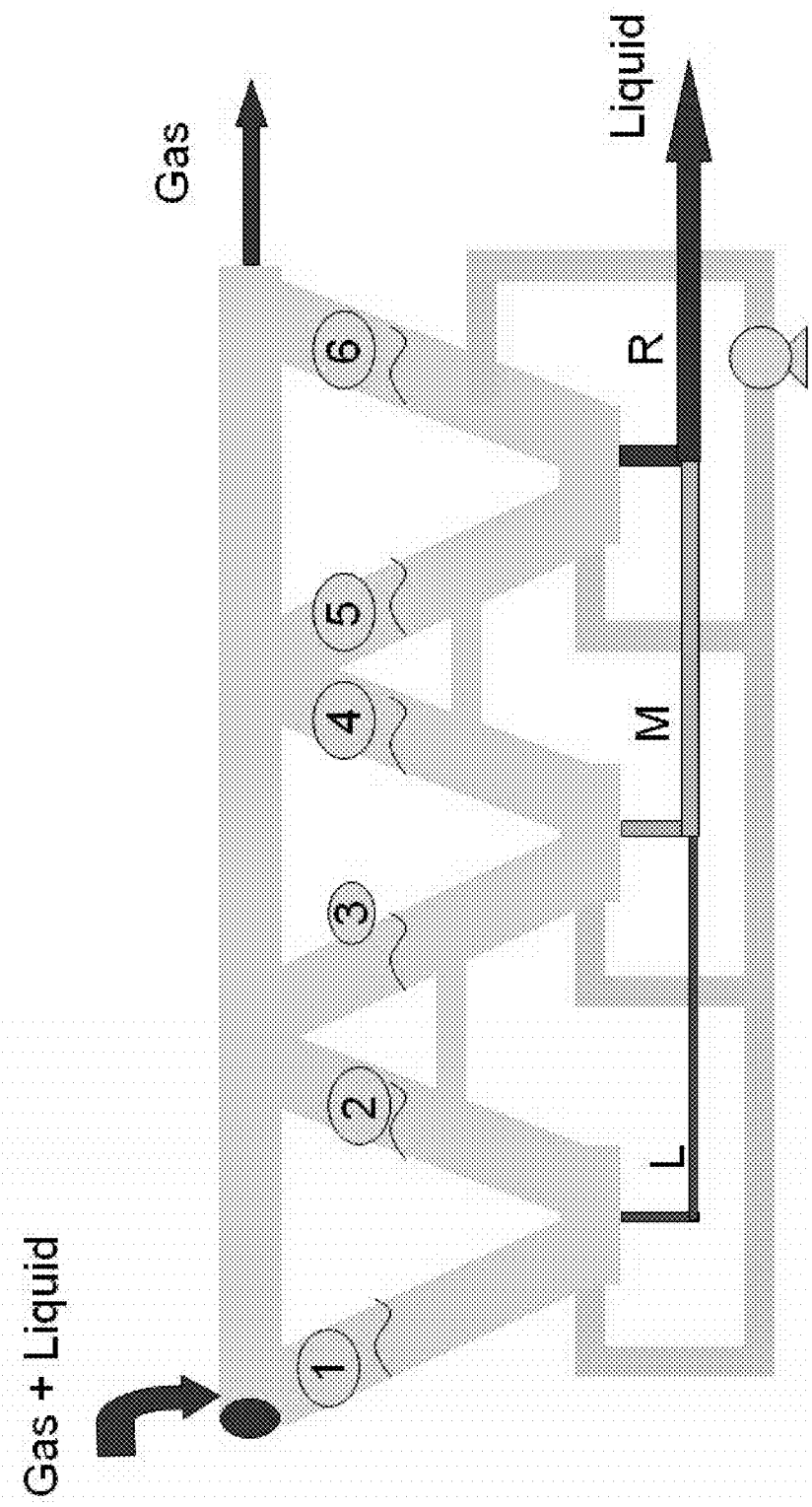

To address concerns with potential 'short circuiting' of separation due to too much liquid flow exiting the first V-shaped element through the liquid withdrawal conduit before the entrained gas is completely separated from the liquid and sand, the outflow rate may be controlled as exemplarily depicted in FIG. 2C. Here, the liquid outlet pipe size is smallest (L) at the first V-shaped element, and then increases progressively in size (M, L) with each downstream subsequent V-shaped element. Thus, it should be appreciated that the size of the liquid outlet can chosen such that only a small amount of liquid (but sufficient to move the sand) exits the separator at each of the V other than the final V. Alternatively, the liquid/sand flow could also be controlled using valves or other flow control methods known in the art.

Therefore, it should be recognized that a fluid containing a gas, a liquid, and sand can be separated in a method in which the fluid is fed into in one location of a main pipe, wherein a plurality of descending branch pipes are coupled to the main pipe, and wherein each of the descending branch pipes has a lower end and is fluidly coupled to a flush conduit. In another step, a flush fluid is fed through the flush conduit into the branch pipe, and in yet another step, at least a portion of the liquid, the flush fluid, and the sand is removed from the lower ends of the branch pipes, and the gas from is removed the main pipe in another location of the main pipe.

Thus, specific embodiments, devices, and methods for gas-liquid separators have been disclosed. It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

What is claimed is:

1. A gas-liquid separator, comprising:
    a main pipe having a first and second end, wherein the main pipe is configured to receive a fluid containing a gas, a liquid, and sand at the first end for flow through the second end;
    a plurality of descending branch pipes, wherein each branch pipe extends downward from the main pipe between the first end of the main pipe and the second end of the main pipe;
    wherein each branch pipe has an upper end fluidly coupled to the main pipe and a lower end fluidly coupled to the lower end of one of the other branch pipes to allow the liquid to segregate from the main pipe into a first of the branch pipes and to migrate from the first of the branch pipes into at least a second of the branch pipes while the gas remains in the main pipe; and
    wherein the lower end of at least one of the branch pipes is fluidly coupled to a flush conduit and a liquid withdrawal conduit;
    wherein the flush conduit is configured to circulate a flushing fluid to the lower end of the at least one of the plurality of branch pipes; and
    a first cross-flow conduit extending from a first of the branch pipes to a second of the branch pipes, wherein the first cross-flow conduit has an inlet end coupled to the first of the branch pipes between the upper end and the lower end of the first of the branch pipes and an outlet end coupled to the second of the branch pipes between the upper end and the lower end of the second of the branch pipes.

2. The gas-liquid separator of claim 1 wherein the plurality of descending branch pipes are each coupled to the main pipe at a non-rectangular angle.

3. The gas-liquid separator of claim 1 wherein the first and the second descending branch pipes are coupled to each other at the lower end.

4. The gas-liquid separator of claim 1 wherein the first cross-flow conduit has a smaller diameter than the descending branch pipes.

5. The gas-liquid separator of claim 1 further comprising at least one of a feed manifold and a gas manifold fluidly coupled to respective ends of the main pipe.

6. The gas-liquid separator of claim 1 wherein the flushing fluid comprises at least a portion of the liquid, wherein the flush conduit is fluidly coupled to at least one of the descending branch pipes such that the flush conduit receives the portion of the liquid from the at least one of the descending branch pipes.

7. The gas-liquid separator of claim 1 wherein the liquid withdrawal conduit is configured to allow removal of the liquid and the sand.

8. The gas-liquid separator of claim 1 further comprising a plurality of sensors, and wherein at least one of the sensors is a pressure sensor or a flow sensor.

9. The gas-liquid separator of claim 1 wherein the flush conduit is configured to circulate the flushing fluid to each of the plurality of branch pipes.

10. The gas-liquid separator of claim 4, wherein the first cross-flow conduit is oriented at an angle from horizontal.

11. The gas-liquid separator of claim 1, wherein the second of the branch pipes and a third of the branch pipes are coupled to each other at their lower ends.

12. The gas-liquid separator of claim 11, wherein the second of the branch pipes and a third of the branch pipes are coupled to form a V-shape; and
    wherein a fourth of the branch pipes and a fifth of the branch pipes are coupled to form a V-shape.

13. The gas-liquid separator of claim 12, further comprising a second cross-flow conduit extending from the fourth of the branch pipes to the fifth of the branch pipes, wherein the second cross-flow conduit has an inlet end coupled to the fourth of the branch pipes between the upper end and the lower end of the fourth of the branch pipes and an outlet end coupled to the fifth of the branch pipes between the upper end and the lower end of the fifth of the branch pipes.

14. The gas-liquid separator of claim 1, wherein the second of the branch pipes and a third of the branch pipes are coupled to form a V-shape; wherein a fourth of the branch pipes and a fifth of the branch pipes are coupled to form a V-shape; and wherein a sixth of the branch pipes and a seventh of the branch pipes are coupled to each other at their lower ends to form a V-shape.

15. The gas-liquid separator of claim 1, wherein the liquid withdrawal conduit and the flush conduit are coupled to all of the descending branch pipes at their respective lower ends.

* * * * *